United States Patent [19]
Darcy

[11] Patent Number: 5,858,252
[45] Date of Patent: Jan. 12, 1999

[54] LIQUID PURIFICATION SYSTEM

[76] Inventor: Harold J. Darcy, 6001 Savoy #110, Houston, Tex. 77036

[21] Appl. No.: 848,322

[22] Filed: Apr. 30, 1997

Related U.S. Application Data

[63] Continuation-in-part of Ser. No. 512,570, Aug. 8, 1995, abandoned.

[51] Int. Cl.$^6$ ......................... B01D 17/028; B01D 17/038
[52] U.S. Cl. ...................... 210/788; 210/802; 210/512.1; 210/519; 210/522; 210/532.1; 210/540
[58] Field of Search .............................. 210/304, 512.1, 210/519, 522, 532.1, 534, 535, 540, 788, 801–803

[56] References Cited

U.S. PATENT DOCUMENTS

| | | |
|---|---|---|
| 1,604,652 | 10/1926 | Manning . |
| 1,658,560 | 2/1928 | Kellogg .................................... 210/519 |
| 2,207,399 | 7/1940 | Gaertner .................................. 210/802 |
| 3,349,548 | 10/1967 | Boyen .................................. 210/512.1 |
| 3,362,534 | 1/1968 | Kay ......................................... 210/84 |
| 3,371,033 | 2/1968 | Simmons et al. ............................ 210/3 |
| 3,779,913 | 12/1973 | Martin ...................................... 210/63 |
| 3,931,011 | 1/1976 | Richards et al. ......................... 210/136 |
| 4,091,265 | 5/1978 | Richards et al. ......................... 219/501 |
| 4,126,544 | 11/1978 | Baensch et al. ........................... 210/11 |
| 4,202,788 | 5/1980 | Middelbeek ............................. 210/522 |
| 4,495,069 | 1/1985 | Davis ...................................... 210/114 |
| 4,502,954 | 3/1985 | Druffel .................................... 210/304 |
| 4,772,401 | 9/1988 | Rawlins .................................. 210/805 |
| 4,789,098 | 12/1988 | Shepherd et al. .................. 237/12.3 R |
| 4,986,907 | 1/1991 | Uzeta ..................................... 210/179 |
| 5,143,608 | 9/1992 | Marshall, Sr. ........................... 210/172 |
| 5,264,121 | 11/1993 | Guzman-Sanchez .................... 210/801 |
| 5,443,724 | 8/1995 | Williamson et al. ................ 210/323.2 |
| 5,443,726 | 8/1995 | Steiner et al. ........................... 210/393 |
| 5,445,173 | 8/1995 | Aiken .................................. 134/167 R |
| 5,453,197 | 9/1995 | Strefling .................................. 210/519 |
| 5,534,138 | 7/1996 | Coale ................................... 210/512.1 |
| 5,534,161 | 7/1996 | Tarr et al. .............................. 210/416.4 |

FOREIGN PATENT DOCUMENTS 885535   12/1961   United Kingdom ................... 210/304

OTHER PUBLICATIONS

"Application Report 92–115N003," John Meunier, Sep. 1993.
"Application Report 92–057N001," John Meunier, Sep. 1993.
"Separateur DLR," ATE Separepur, 1993.
"Filtration & Separation," Flo Trend Systems, Inc., 1993.
"Fuel Cleaner," Motor Boating & Sailing, Jun. 1995.
"DeBug Your Fuel," Southern Boating, May 1995.
"Clean Fuel, Clean Engine," Marlin, May 1995.
"The Permanent Solution," RCI Purifier, 1994.
"Defending Your Engine," Power & Motoryacht, Apr. 1995.

*Primary Examiner*—Matthew O. Savage
*Attorney, Agent, or Firm*—Guy McClung

[57] ABSTRACT

A novel, useful and nonobvious fuel purifier has been developed which in one aspect has a hollow vessel with an interior space, an inlet for liquid fuel contaminated with contaminating material denser than the liquid fuel, the liquid fuel entering the inlet into the interior space in a first direction, and an outlet from which liquid fuel flows out from the hollow vessel, a flow diverter adjacent the inlet within the interior space for diverting the liquid fuel in a second direction other than the first direction, at least one divider apparatus within the interior space of the hollow vessel which divides the interior space into an inlet chamber, at least one intermediate chamber, and an outlet chamber, the outlet in fluid communication with the outlet chamber, the inlet in fluid communication with the inlet chamber, the at least one intermediate chamber providing at least one quiescent zone in which the contaminating material settles out from the liquid fuel contaminated with contaminating material, a drain in fluid communication with the interior space of the hollow vessel and through which is drained contaminated material which settles out from the liquid fuel, and the outlet port disposed for the exit of liquid fuel from which contaminated material has settled out.

10 Claims, 8 Drawing Sheets

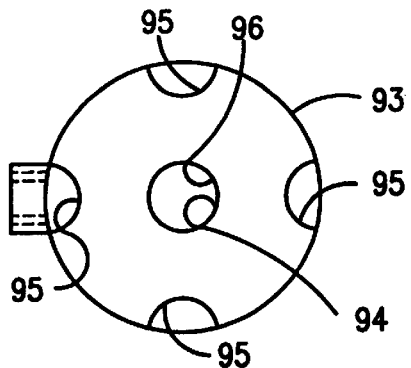
FIG. 9
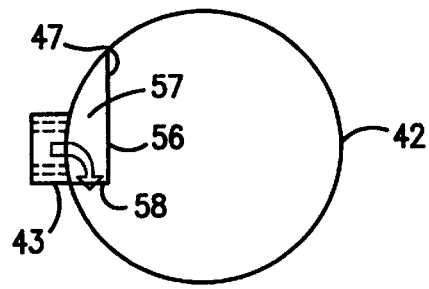
FIG. 10
FIG.11b
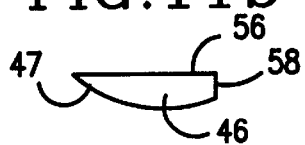
FIG.11f
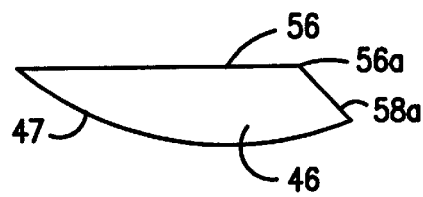
FIG.11d
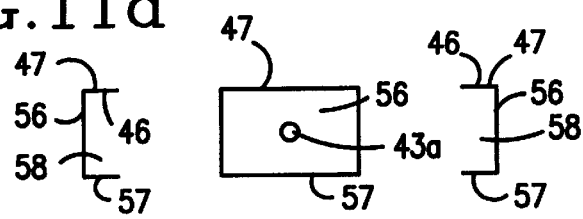
FIG.11a  FIG.11e
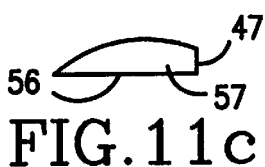
FIG.11c
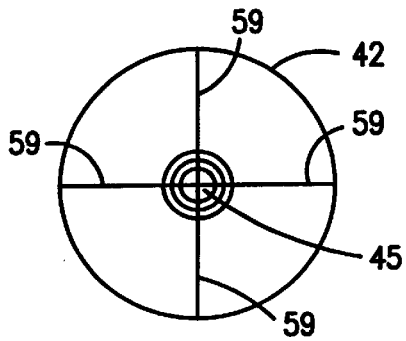
FIG. 12
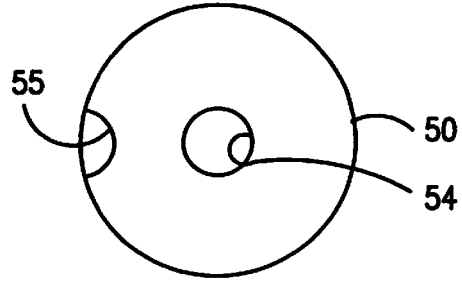
FIG. 13

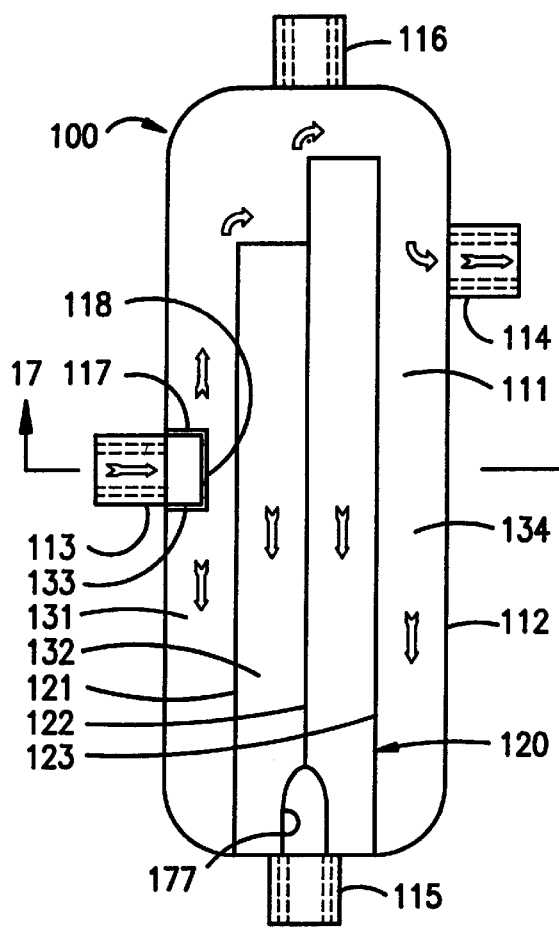
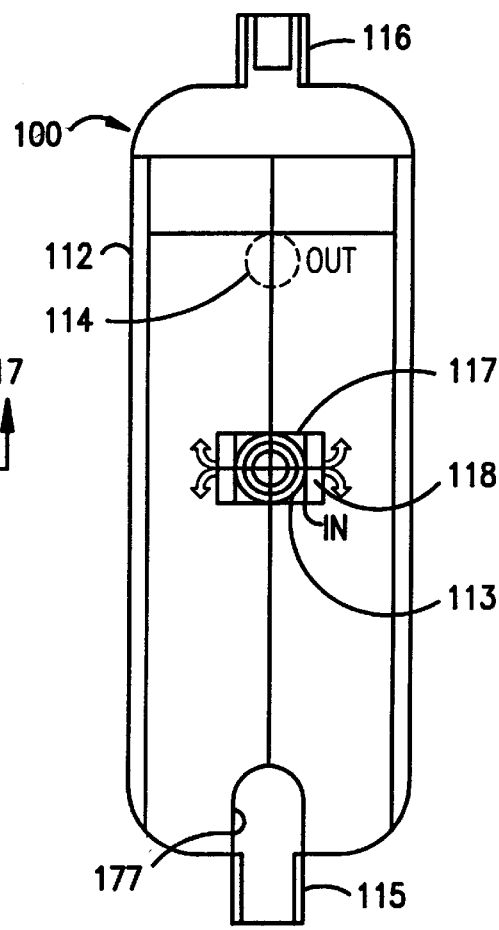
FIG. 14     FIG. 15
FIG. 16a
FIG. 16b     FIG. 16c
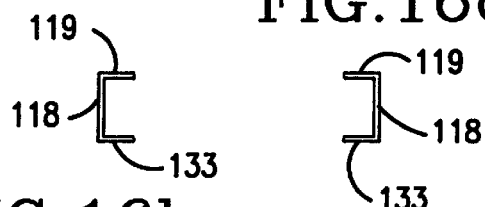
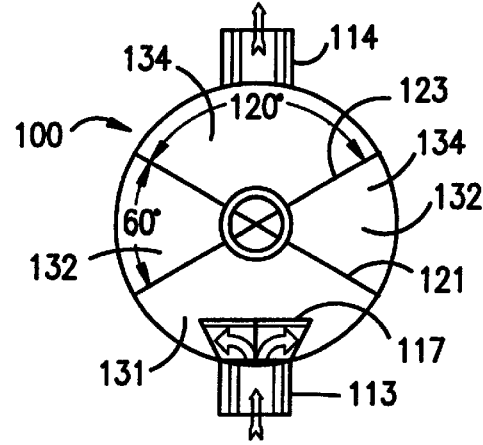
FIG. 17

LIQUID PURIFICATION SYSTEM

RELATED APPLICATION

This is a continuation-in-part of U.S. application Ser. No. 08/512,570 filed on Aug. 8, 1995 entitled "Fuel Purification System" and co-owned with the present invention, now abandoned.

BACKGROUND OF THE INVENTION

1. Field of the Invention

The present invention is directed to liquid purifying systems and, in one aspect, to fuel purifying systems (e.g., but not limited to systems for purifying gasoline, jet fuel and diesel fuel). In one particular aspect the present invention is directed to a diesel fuel purifying system having a vessel with one or more quiescent chambers in which water, condensates, liquid contaminants, and particulates settle out from the diesel fuel.

2. Description of Related Art

Liquid fuel contaminated with water or solid particulates reduces engine efficiency and often results in engine failure. Such failures result in inefficient down-time and require costly repair or replacement. A wide variety of filters are available for filtering water and solid particulates from fuel; but filter elements become laden with and clogged by the materials they filter out from fuel and must be cleaned or replaced.

Fuel purifying apparatus, such as that disclosed in U.S. Pat. No. 4,986,907, has a hollow cylindrical body into which impure fuel is introduced under pressure. The apparatus has internal parts that increase fuel turbulence and cause the fuel to move circularly around the hollow cylinder to disengage water and suspended solids from the fuel. The apparatus has a heater and a divider plate. The apparatus is used in-line between a fuel tank and an engine, and between the fuel tank and a filter. A variety of problems are associated with fuel purifiers as described above. Since such apparatuses are used in-line between a tank and an engine, any water or solids not separated from the fuel goes forward to a filter, if one is used, and, (if the filter does not filter out the materials) to the engine. The purifier apparatus is unable to handle relatively high fuel flow rates, resulting in a portion of untreated fuel flowing on to the filter and/or engine. Purging of such an apparatus in-line can allow air to be introduced into the fuel line.

Another problem encountered in fuel tanks is the growth of algae, fungus, yeast, mold, and bacteria, often in mats, globules, long lines, chains, or strings. Such organisms can grow in condensate (e.g. water) in a fuel tank. Some of these organisms can eat fuel. An in-line fuel purifier as described above has little or no effect on such growth. Such materials can clog filters and engines. Under certain conditions if water is present in diesel fuel, sulfur in the fuel combines with the water to form sulfuric acid.

The prior art has numerous examples of liquid purification systems and methods, many of which involve complex apparatuses and complicated procedures.

There has long been a need for an effective liquid and/or fuel purifying systems which overcome the problems stated above and accomplishes this in an efficient and cost-effective manner.

SUMMARY OF THE PRESENT INVENTION

The present invention, in certain embodiments, discloses a fuel purifying system which has a hollow vessel with one or more fuel inlets a fuel outlet, and a drain from which water, liquid (e.g. but not limited to glycol, antifreeze), and particulate contaminates are removed from the vessel. Interior dividers or plates define at least three chambers or areas within the vessel: an inlet chamber into which the contaminated fluid is pumped, preferably turbulently through the fuel inlet; at least one intermediate chamber which is relatively quiescent and in which fuel turbulence is reduced so that water and particulates settle out to the bottom of the vessel; and an exit chamber from which, in one aspect, the purified fuel exits the vessel through the fuel outlet. The drain is used to drain separated materials of higher density than the fuel from the intermediate chamber(s). In another aspect, the exit chamber is above the intermediate chamber and an outlet chamber (in communication with the intermediate chamber) into which contaminants flow to the drain.

In certain embodiments the fuel initially introduced into the inlet chamber is directed at at least one wall, diverter, or manifold to reduce its velocity and change its direction. One particular manifold has upper and lower flow blockers allowing fuel to flow in left and right directions; another manifold allows fuel to flow out in only one general direction, e.g. only to the side rather than up or down. In one particular aspect the manifold is sized, configured, and disposed so that from a single exit flows a sheet-like or laminar stream of liquid to be treated in the system. Such a sheet stream facilitates separation of components of different density. Two, three, or more such diverters or manifolds may be used on a single vessel each with a corresponding inlet. In other embodiments a vessel is used of sufficient height that settling out of contaminants is achieved without a flow diverter, in one aspect when fluid flow rates are relatively low, e.g. half a gallon a minute.

In certain embodiments a purge or bleed mechanism at the top of the vessel permits air or other gas to be released from the vessel.

In certain embodiments, (e.g. but not limited to situations of high velocity and/or high volume fuel flow) any of the chambers, or combination of them, may be housed in a separate vessel or vessels. Each separate chamber or vessel may have its own inlet, outlet, drain, and/or gas purge mechanism.

In certain embodiments a fuel purifying system according to the present invention has its inlet and outlet in fluid communication with a fuel tank, i.e., not in-line between a tank and an engine. In this way fuel can be continuously recycled through the fuel purifying system. Such a configuration also results in the breaking up of strings of growing algae and bacteria (particularly if the inlet is at or near a bottom of the tank).

Any suitable pump or pumps may be used to pump fuel to and from the fuel purifying apparatus. A pump may be used between the inlet of the purification apparatus and the tank; between an outlet of the fuel purification apparatus and the tank; or both. In one preferred embodiment of the total volume of fuel in a tank to be purified about 10% or more of the fuel is pumped through the purification apparatus every hour; e.g. for a tank with a volume of 600 gallons a pump capable of pumping 1 gallon per minute is used.

In one aspect material to be separated from a liquid (e.g. droplets of a denser liquid or solid particles) enters the relatively quiescent intermediate chamber(s) and is allowed to flow downwardly between upright wall(s) defining the quiescent area separating from the main liquid with reduced turbulence without interruption, without contacting other members, and with as much time as needed to effect the separation.

The present invention, in certain aspects, discloses a fuel purifier with a hollow vessel with a top, a bottom, and an upright side wall that define an interior space within the hollow vessel, an inlet for liquid fuel contaminated with contaminating material denser than the liquid fuel, the inlet configured and disposed so that liquid fuel entering the inlet is flowable therefrom into the interior space in a first direction, the hollow vessel having an outlet from which liquid fuel is flowable out from the hollow vessel, at least one first substantially vertical baffle within the interior space of the hollow vessel and at least one second substantially vertical baffle within the interior space of the hollow vessel and spaced apart from the at least one first substantially vertical baffle, the baffles dividing the interior space into an inlet chamber, at least one intermediate chamber, and an outlet chamber, the outlet in fluid communication with the outlet chamber, the inlet in fluid communication with the inlet chamber, the at least one intermediate chamber providing at least one quiescent zone defined laterally by substantially vertical baffles, so that contaminating material is able to move between substantially vertical baffles downwardly to settle out from the liquid fuel contaminated with contaminating material, a drain in fluid communication with the interior space of the hollow vessel and through which may drain contaminated material which settles out from the liquid fuel, the outlet disposed for the exit of liquid fuel from which contaminated material has settled out, the inlet, first substantially vertical baffle, and inlet chamber sized and disposed so that contaminated liquid fuel entering the inlet chamber through the inlet is flowable freely vertically upwardly and freely downwardly in the inlet chamber, and contaminated liquid fuel is flowable upwardly to pass over a top of the first substantially vertical baffle into the intermediate chamber, and the intermediate chamber and second substantially vertical baffle sized and disposed so that contaminated liquid fuel entering the intermediate chamber is flowable freely vertically upwardly and freely downwardly in the intermediate chamber, and contaminated liquid fuel is flowable upwardly to pass over a top of the second substantially vertical baffle into the outlet chamber; such a fuel purifier with a flow diverter adjacent the inlet within the interior space for diverting the liquid fuel in a second direction other than the first direction; any such fuel purifier with a plurality of at least three substantially vertical baffles and a plurality of at least two intermediate chambers defined in part by the plurality of at least three substantially vertical baffles; any such fuel purifier with a bottom space within the hollow vessel in fluid communication with a bottom of each of the inlet chamber, at least one intermediate chamber, and outlet chamber, and the drain draining from the bottom space; any such fuel purifier with the flow diverter having a back wall, the back wall disposed normal to a direction of fuel flowing in the inlet, a top wall secured to a top of the back wall, and a bottom wall secured to a bottom of the back wall; any such fuel purifier wherein the flow diverter further has a side wall closing off a first end of the flow diverter, and/or all sides thereof so that fluid must only flow out of a second open end of the flow diverter; such a fuel purifier with such a flow diverter from which a sheet of liquid, a sheet-like stream, or a laminar stream (all collectively referred to as "sheet stream") flows from the second open end; any such fuel purifier with gas purge apparatus intercommunicating with the interior space of the hollow vessel; any such fuel purifier wherein fuel is most turbulent in a first chamber adjacent the inlet and is less turbulent in intermediate chambers not adjacent the inlet; any such fuel purifier with a tank with liquid fuel contaminated with contaminating material denser than the liquid fuel, an inlet flow line interconnected between the tank and the hollow vessel through which the liquid fuel flows from the tank into the hollow vessel, and an outlet flow line interconnected between the tank and the hollow vessel through which liquid fuel from the outlet of the hollow vessel flows into the tank; any such fuel purifier with pump apparatus for pumping liquid fuel in the inlet flow line; any such fuel purifier with pump apparatus for pumping liquid fuel in the outlet flow line; any such fuel purifier with an engine, an engine fuel line interconnected between the tank and the engine, and pump apparatus for pumping liquid fuel from the tank to the engine; any such fuel purifier with filter apparatus in line between the tank and the engine for filtering liquid fuel; and any such fuel purifier in which instead of fuel a liquid other than fuel is purified including but not limited to a mixture of at least two liquids of different densities and at least one denser liquid is separated from another liquid.

The present invention, in certain aspects, discloses a method for purifying liquid fuel in a tank contaminated with contaminating material, the method including flowing the liquid fuel with contaminating material from the tank to a fuel purifier for purification therein, the fuel purifier having a hollow vessel with a top, a bottom, and an upright side wall that defines an interior space within the hollow vessel, an inlet for liquid fuel contaminated with contaminating material denser than the liquid fuel, the liquid fuel entering the inlet into the interior space in a first direction, and an outlet from which liquid fuel flows out from the hollow vessel, at least one first substantially vertical baffle within the interior space of the hollow vessel and at least one second substantially vertical baffle within the interior space of the hollow vessel and spaced apart from the at least one first substantially vertical baffle, the substantially vertical baffles dividing the interior space into an inlet chamber, at least one intermediate chamber, and an outlet chamber, the outlet in fluid communication with the outlet chamber, the inlet in fluid communication with the inlet chamber, the at least one intermediate chamber providing at least one quiescent zone defined laterally by substantially vertical baffles and in which the contaminating material moves downwardly between the substantially vertical baffles and settles out from the liquid fuel contaminated with contaminating material, a drain in fluid communication with the interior space of the hollow vessel and through which is drained contaminated material which settles out from the liquid fuel, the outlet disposed for the exit of liquid fuel from which contaminated material has settled out, the inlet, first substantially vertical baffle, and inlet chamber disposed so that contaminated liquid fuel entering the inlet chamber through the inlet flows freely upwardly and freely downwardly in the inlet chamber, contaminated liquid fuel flowing upwardly passing over a top of the first substantially vertical baffle into the intermediate chamber, and the intermediate chamber and second substantially vertical baffle disposed so that contaminated liquid fuel entering the intermediate chamber flows freely upwardly and freely downwardly in the intermediate chamber, contaminated liquid fuel flowing upwardly passing over a top of the second substantially vertical baffle into the outlet chamber, flowing the liquid fuel with contaminating material into and through the fuel purifier, and flowing purified fuel out from the outlet of the fuel purifier; such a method including flowing the purified fuel to an engine; such a method including flowing the purified fuel back to the inlet for further purification in the hollow vessel; such a method including flowing the liquid fuel to a flow diverter adjacent the inlet within the interior space for diverting the liquid fuel in a direction other than the first direction; such a method wherein the at least one first substantially vertical baffle is a plurality of at least two substantially vertical baffles, and wherein the at least one intermediate chamber is a plurality of at least two intermediate chambers each defined laterally by two substantially vertical baffles; such a method wherein a flow diverter adjacent the inlet within the interior space for diverting the liquid fuel in a second direction other than the first direction; any such method wherein the flow diverter further includes a side wall closing off a first end of the flow diverter so that fluid must flow out of a second open end of the flow diverter; and any such method wherein instead of fuel one or more liquids of different density is separated from another liquid using any such method.

In certain embodiments, the present invention discloses a fuel purifier of as disclosed herein and described above wherein the inlet is a generally cylindrical pipe with an inner diameter through which liquid fuel flows into the flow diverter and a second open end has a rectangular shape with a width that is between about 30% to about 60% (and in one aspect, about 50%) of the inner diameter of the cylindrical pipe and, incertain aspects, wherein a length of the second open end is about 40% to about 60% (and in one aspect, about 50%) of the inner diameter of the cylindrical pipe.

It is, therefore, an object of at least certain preferred embodiments of the present invention to provide:

New, useful, unique, efficient, nonobvious fuel purifying systems;

Another object is the provision of such systems for purifying diesel fuel;

Another object of such systems is the removal of water and solid contaminates from fuel;

Another object of such systems is the provision of a fuel treatment vessel with one or more relatively quiescent chambers or areas to facilitate the settling out of contaminating materials denser than the fuel;

Another object is the provision of such systems in which fuel circulation in a tank inhibits the growth of algae and bacteria in the tank and inhibits the growth of strings of such material; and which, in one aspect, does this by removing water and/or contaminants from fuel;

Another object is the provision of a system which may be used to recirculate and recycle fuel from a tank for continuous purification and which does not necessarily have to be used in-line between a fuel tank and an engine;

Another object of the present invention is the provision, in certain embodiments, of a system which does not utilize replaceable filter elements or heating elements; and New, useful, unique, efficient, nonobvious liquid separation systems and methods for separating liquids of different densities.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 9 is a top cross-section view along line 9—9 of FIG. 7.

FIG. 10 is a top cross-section view of an inlet and manifold of the apparatus of FIG. 6 along line 10—10.

FIG. 11a is a front view of a flow diverter or manifold of the system of FIG. 6.

FIG. 11b is a top view of the flow diverter of FIG. 11a.

FIG. 11c is a bottom view.

FIG. 11d is an end view.

FIG. 11e is an end view of the flow diverter of FIG. 11a.

FIG. 11f is a top view of a flow diverter according to the present invention.

FIG. 12 is a bottom view of the vessel of the system of FIG. 6 with oscillation baffles therein.

FIG. 13 is a top view in cross-section of the system of FIG. 6 along line 13—13.

FIG. 14 is a side view in cross-section of a fuel purifying system according to the present invention.

FIG. 15 is a front view of the apparatus of FIG. 14.

FIG. 16a is a top view of an inlet manifold of the apparatus of FIG. 11.

FIGS. 16b and 16c are end views of the apparatus of FIG. 16a.

FIG. 17 is a top cross-sectional view along line 17—17 of FIG. 14.

FIG. 24b is a cross-section view along line 24b—24b of FIG. 24a.

FIG. 24c is a side view of a manifold of the system of FIG. 24a.

FIG. 24d is a side view of part of a top baffle of the system of FIG. 24a.

FIG. 24e is a side view of part of a bottom baffle of the system of FIG. 24a.

DESCRIPTION OF EMBODIMENTS PREFERRED AT THE TIME OF FILING FOR THIS PATENT

Figure 1:
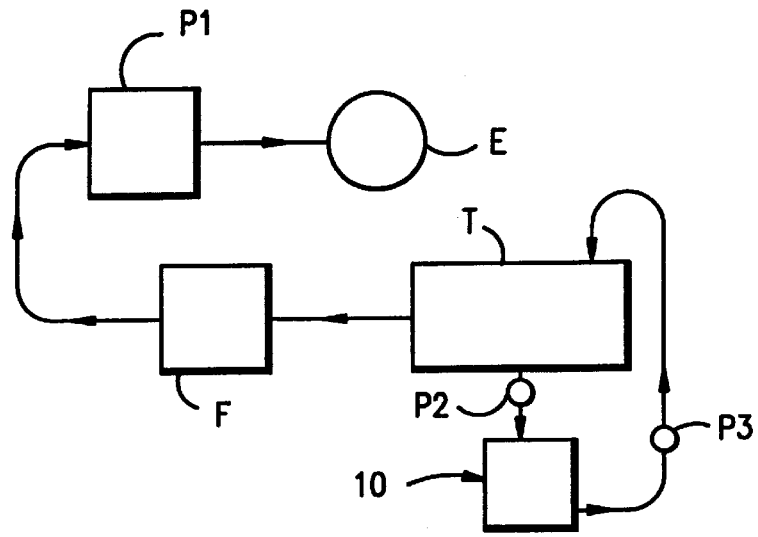
FIG. 1 is a schematic view of a fuel purifying system according to the present invention.

Referring now to FIGS. 2–5, a fuel purifier 10 according to the present invention has a hollow vessel 12 with an interior space 11, a fuel inlet 13, a fuel outlet 14, a drain 15, a gas (e.g. air) purge 16, an inlet manifold or fuel flow diverter 17, and divider apparatus 20 which includes substantially vertical upright baffles 21, 22, and 23. In certain embodiments the baffles are the same height in the vessel 12; as shown the baffles 21, 22, 23 increase in height away from the inlet 13 and toward the outlet 14 because turbulence in the inlet chamber 31 may carry contaminants upward, but by crossing the lower baffle 21 contaminants may fall into the non-turbulent chamber 32, and any remaining contaminants still rising can cross over baffle 22 and fall out in the non-turbulent chamber 33, giving the clean fuel the opportunity to rise over the highest baffle 23.

Figure 2:
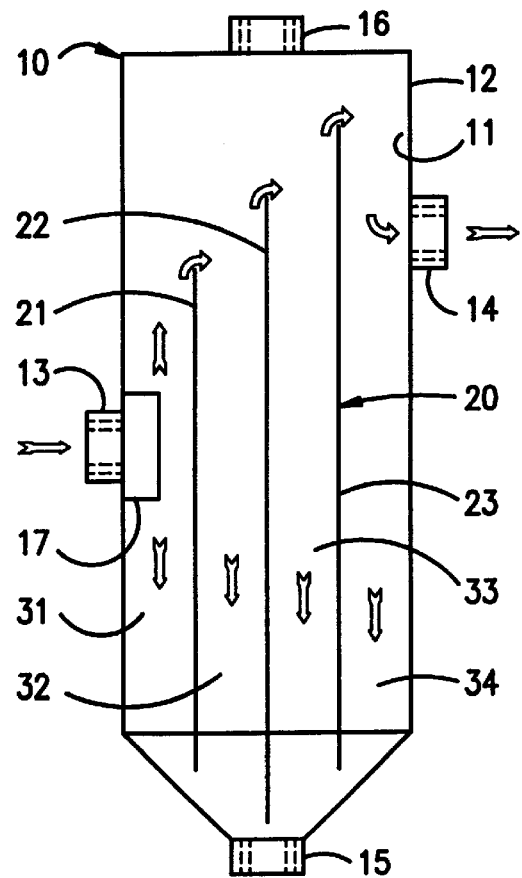
FIG. 2 is a side view in cross-section of a fuel purifying system according to the present invention.

Arrows pointing upwardly and horizontally in FIG. 2 show schematically the general direction of flow of liquid fuel from which contaminated material is settling out toward the bottom of the vessel 12. Downwardly pointing arrows indicate the general direction of flow of contaminated material that is settling out from the fuel (e.g. water, bacteria, algae, and/or suspended particulate solids in a fuel such as diesel fuel). In one aspect the baffles are substantially upright and no member or other object is in the path of liquid and/or material in the non-turbulent chambers so that the liquid and/or material may take as much time as needed to move down in the chamber(s) to settle out from the main fuel flow. The divider apparatus 20 is in certain embodiments secured in any suitable manner (not shown) to the vessel 12 e.g. by welding, adhesives, or fasteners such as nuts and bolts. In other embodiments the divider apparatus 20 is sized and configured to sit within the vessel 12 without additional securement.

Appropriate known selective closure devices (manual and/or automatic) are used for the inlet 13, outlet 14, drain 15 and gas purge 16. Also, as desired a pump or pumps may be used at any of these openings to facilitate fluid flow. As shown schematically in FIG. 1 in one aspect the purifier 10 (and other purifiers disclosed herein) is used in intercommunication with a tank of fuel T with the purifier's inlet and outlet in fluid communication with the tank T for continuous recycling of fuel through the purifier and so that the purifier is not in-line between the tank T and a filter F device and engine E. A pump P1 pumps fuel in the system. A pump P2 pumps fuel from the tank T to an inlet of the purifier 10. A pump P3 pumps fuel from the purifier 10 to an inlet of the tank T. With either pump P2 or P3, or both, in continuous operation, continuous recycling and purification of the fuel is achieved. A single pump may be used in certain embodiments.

Figure 3:
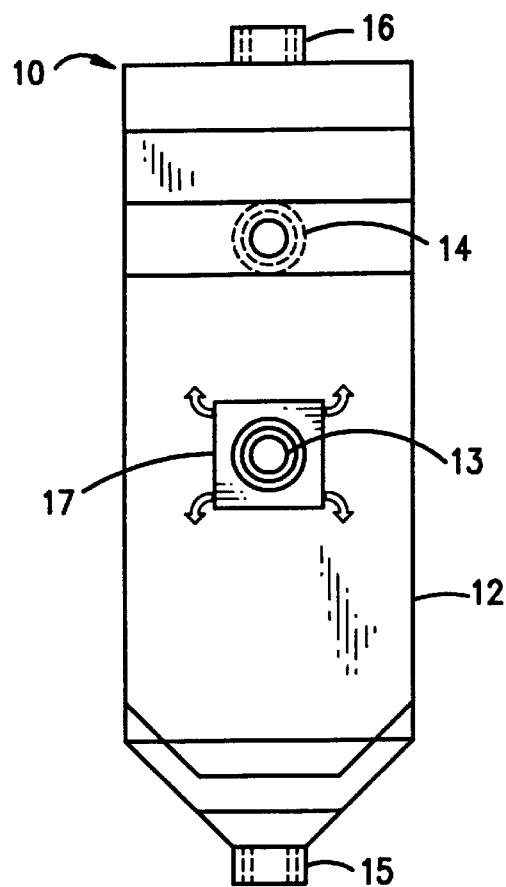
FIG. 3 is a front view of the apparatus of FIG. 2.
Figure 4:
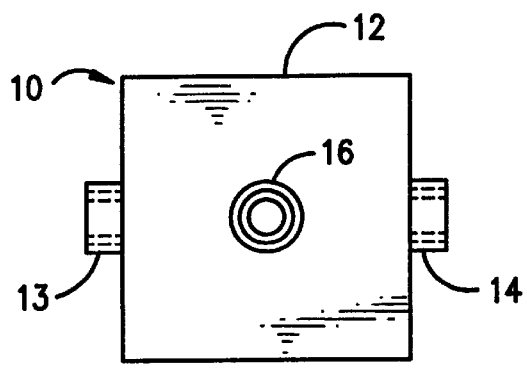
FIG. 4 is a top view of the apparatus of FIG. 2.
Figure 5:
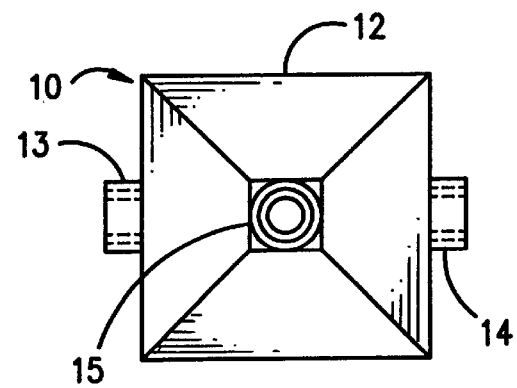
FIG. 5 is a bottom view of the apparatus of FIG. 2.

Arrows in FIG. 3 show that the flow diverter 17 changes the direction of inlet fuel flow from a first direction, as shown in FIG. 2 by the arrow to the left of the inlet 13, to a second direction or directions (shown by the four arrows in FIG. 3) other than the first direction. The diverter also reduces the velocity of the inlet fuel.

Fuel turbulence is greatest in a first inlet chamber 31, defined generally by the baffle 21 and a portion of the interior surface of the vessel, due to the inlet fuel flow and the effects of the flow diverter, as compared to other chambers in the vessel 12. Fuel in a first intermediate chamber 32, defined generally by baffles 21 and 22, is relatively quiescent as compared to the fuel in the first inlet chamber 31. Fuel is more quiescent in a second intermediate chamber 33, defined generally by baffles 22 and 23, than fuel in the first chamber 31. Settling out of contaminating material occurs in all chambers 31, 32, 33 and in an outlet chamber 34. Contaminating material is able to move between the substantially vertical baffles downwardly unimpeded to settle out from the main stream of liquid fuel. The baffles do not extend all the way to the bottom surface of the vessel 12's interior space so that contaminating materials from all chambers flow to the drain 15. Alternatively, holes are provided in the lower baffle ends.

FIGS. 6–13 illustrate a fuel purifier 40 according to the present invention which has a hollow vessel 42 with an interior space 41, a fuel inlet 43, a fuel outlet 44, a drain 45, and an inlet fuel flow diverter 47.

Figure 6:
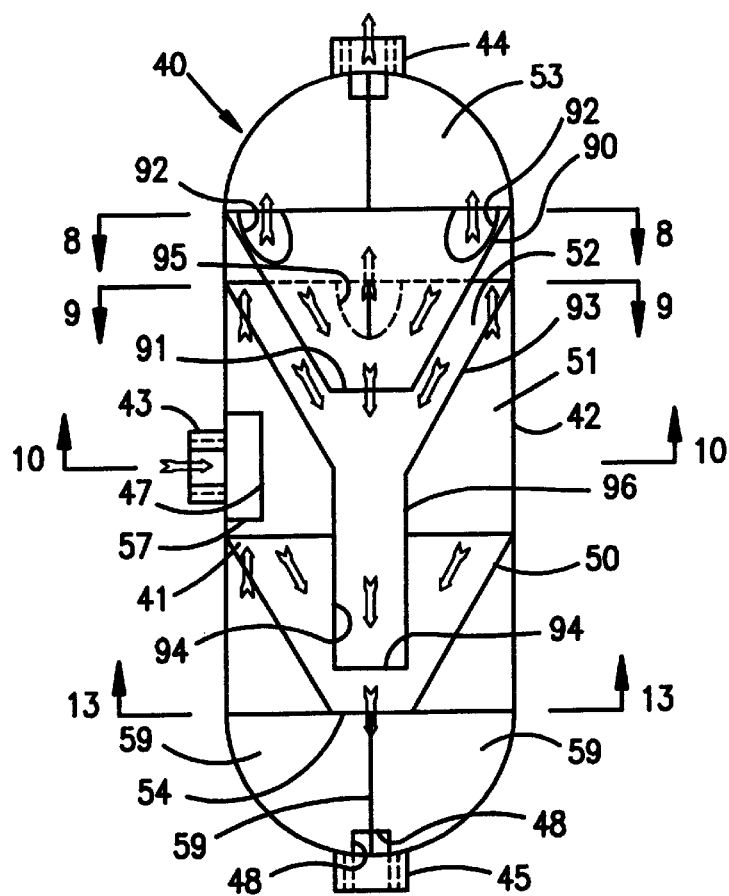
FIG. 6 is a side view in cross-section of a fuel purifying system according to the present invention.
Figure 7:
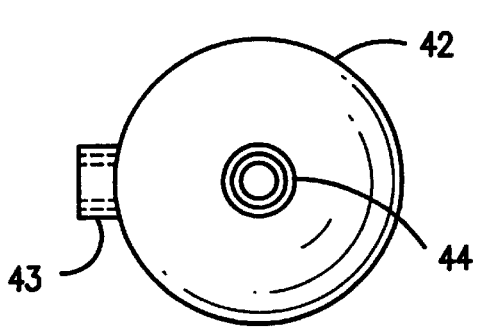
FIG. 7 is a top view of the apparatus of FIG. 6.

Arrows pointing upwardly and horizontally in FIG. 6 show schematically the general direction of flow of liquid fuel from which contaminated material is settling out toward the bottom of the vessel 42. Contaminated material settles out from the fuel and flows to the bottom of the vessel 42 (as shown by downwardly pointing arrows).

Also, as desired a pump or pumps may be used at any of these openings (and at any opening in any embodiment hereof) to facilitate fluid flow.

The flow diverter 47 changes the direction of inlet fuel flow from a first direction to a second direction (or directions in embodiments with more than a single opening 58) other than the first direction. The diverter also reduces the velocity of the inlet fuel.

Fuel turbulence is greatest in a first inlet chamber 51, defined generally by a bottom surface of a middle funnel 93, a top surface of a lower member 50, and a portion of the interior surface of the vessel, due to the inlet fuel flow and the effects of the flow diverter 47, as compared to other chambers in the vessel 12. Fuel in a first intermediate chamber 52, defined generally by a bottom of a top funnel 90, a top of the middle funnel 93, and a portion of the interior surface of the vessel 42, is relatively quiescent as compared to the fuel in the first inlet chamber 51. Fuel ascends to a top chamber 53, defined generally by a top of the top funnel 90 and a portion of the top interior of the vessel 42. Settling out of contaminating material occurs in all chambers 51, 52, 53. FIG. 13 shows a bottom funnel 50 with an opening 54 and a side opening 55. Contaminating materials from all chambers flow through the opening 54 to the drain 45. Alternatively, a plurality of openings 55 are provided in the funnel 50. It is within the scope of this invention to provide a vessel with one, two, or more of any of the funnels described herein.

Figure 8:
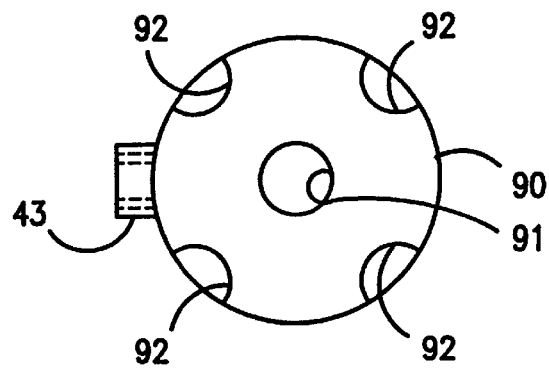
FIG. 8 is a top cross-section view along line 8—8 of FIG. 7.

FIG. 8 shows a top view of the top funnel 90 with its central opening 91 and peripheral openings 92 up through which fuel ascends to the top chamber 53. Contaminants can flow down through the opening 91.

FIG. 9 shows a top view of the middle funnel 93 with its central opening 94, peripheral openings 95 and neck 96. In certain embodiments the openings 95 in the middle funnel 93 are not aligned with the openings 92 of the top funnel 90 (as shown in FIGS. 8 and 9).

FIGS. 10 and 11a–e show the inlet flow diverter 47 which has bottom wall 57, a top wall 46, and a front wall 56 which contacts an interior surface of the vessel 42. In the embodiment shown there are no holes through the bottom wall 57, the top wall 46, or the front wall 56 (other than an inlet 43a in communication with the inlet 43). Diverted fuel flows through a side opening 58. It is within the scope of this invention to have an opening at each end of the flow diverter and to have two or more inlets with a flow diverter for the initial introduction of contaminated fuel or contaminated liquid into the vessel. In certain embodiments in which the flow diverter has one opening (like the opening 58, FIG. 11d), the opening is on a side of the manifold, it is preferred that the single opening be sized and configured to produce a sheet stream of fuel or liquid that is initially forced in sheeet-like fashion into and around the vessel. Applicant believes that the separation of denser materials (liquids, particles) from a main flow of liquid or fuel is facilitated when such denser materials are in a sheet stream. In one aspect the width of the opening (the dimension, e.g. as shown of the opening 58 in FIG. 11b) is between about 30% to 60% of the inner diameter of the vessel inlet (e.g. items 13, FIG. 2; item 43, FIG. 6). In one particular embodiment the width of the opening is about 50% of the inner inlet diameter; e.g. in a system with an inlet pipe with an inner diameter of about a half inch the width opening is about one-fourth inch. FIG. 11f shows an alternative flow diverter configuration wherein there is a single opening 58a which is flared or "cutback" as compared to the opening 58, FIG. 11b. The inventor has found that top and bottom fanning out of the sheet stream exiting from the flow diverter is reduced and sheet integrity is facilitated and maintained by using the flared opening 58a. Such an opening used adjacent a curved interior vessel wall also reduces the impact of the stream exiting from the flow diverter against the interior vesssel wall by permitting the stream to move toward the center of the vessel or expand toward the vessel interior at the point at which it passes the end 56a of the wall 56. It is within the scope of this invention for any flow diverter or manifold disclosed herein to be used in any vessel or system disclosed herein and to use any such flow diverter or manifold with any vessel with all baffles, tubes, and other items deleted from the vessel's interior. Parts similar to those of the embodiment of FIG. 11a are indicated in FIG. 11f with the same numerals.

FIG. 12 shows the vessel 42 with oscillation baffles 59 therein which reduce the effects of moving fuel in the vessel 42, e.g. movement of fuel in a tank on a boat or on a piece of heavy equipment. The baffles do not extend all the way to the top or all the way to the bottom of the vessel; or alternatively the baffles do extend all the way to the bottom of the vessel, but have openings 48 which are in communication with the drain 45.

FIGS. 14–17 illustrate a fuel purifier 100 according to the present invention which has a hollow vessel 112 with an interior space 111, a fuel inlet 113, a fuel outlet 114, a drain 115, a gas (e.g. air) purge 116, an inlet fuel flow diverter 117, and divider apparatus 120 which includes upright baffles 121 and 123 which intersect along a line 122. In certain embodiments the baffles are the same height in the vessel 112; as shown the baffles 121 and 123 increase in height away from the inlet 113 and toward the outlet 114.

Arrows pointing upwardly and horizontally in FIG. 14 show schematically the general direction of flow of liquid fuel from the inlet 113 to the outlet 114. Contaminated material settles out toward the bottom of the vessel 112. Downwardly pointing arrows indicate the general direction of flow of contaminated material that is settling out from the fuel (e.g. water, bacteria, algae, and/or suspended particulate solids in a fuel such as diesel fuel). The divider apparatus 120 is in certain embodiments secured in any suitable manner (not shown) to the vessel 112 (e.g. by welding, adhesives, or fasteners such as nuts and bolts). In other embodiments the divider apparatus 120 is sized and configured to sit within the vessel 112 without additional securement.

Appropriate known selective closure devices (e.g. manual and/or automatic) are used for the inlet 113, outlet 114, drain 115 and gas purge 116. Also, as desired a pump or pumps may be used at any of these openings or in conduits connected with them to facilitate fluid flow.

Arrows in FIG. 15 show that the flow diverter 117 changes the direction of inlet fuel flow from a first direction, as shown in FIG. 14, to a second direction or directions other than the first direction (shown in FIG. 15). The flow diverter also reduces the velocity of the inlet fuel.

Fuel turbulence is greatest in a first inlet chamber 131, defined generally by the baffle 121 and a portion of the interior surface of the vessel 112, due to the inlet fuel flow and the effects of the flow diverter, as compared to other chambers in the vessel 112. Fuel in intermediate chambers 132, defined generally by baffles 121 and 123, is relatively quiescent as compared to the fuel in the first inlet chamber 131. Settling out of contaminating material occurs in all the chambers and in an outlet chamber 134 in which fluid may be more turbulent due to the outlet flow. The baffles do extend all the way to the bottom surface of the vessel 112's interior space and holes 177 are provided in the lower baffle ends so that contaminating materials from all chambers flow to the drain 115.

FIGS. 16a, 16b and 16c show the flow diverter 117 from the top with its rear wall 118, top wall 119 and bottom wall 133. As shown these walls have no holes in them, but holes in each or any of the walls may be provided as desired. FIG. 17 shows the relative spacing between baffle sides; 120° between one set of pairs of sides and 60° between the other pairs of sides.

Figure 18:
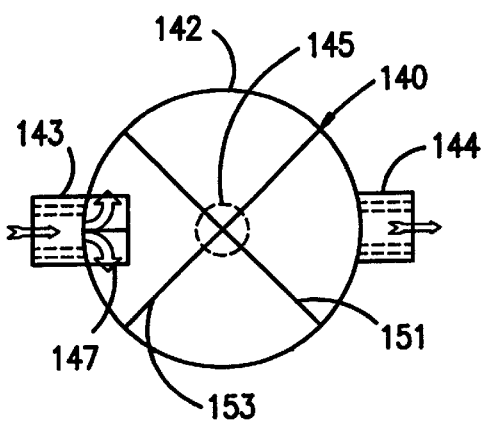
FIG. 18 is a top view in cross-section of an apparatus according to the present invention.
Figure 20:
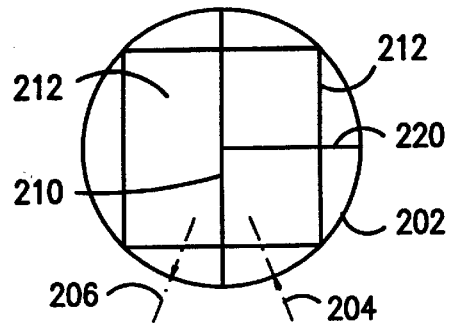
FIG. 20 is a top view in cross-section of the apparatus of FIG. 19.

FIG. 18 illustrates a fuel purifier 140 (like the purifier 100, FIG. 14) according to the present invention which has a hollow vessel 142 with an interior space 141, a fuel inlet 143, a fuel outlet 144, a drain 145, a gas (not shown) (e.g. air) purge 146, an inlet fuel flow diverter 147, and divider apparatus which includes upright baffles 151 and 153. The baffles 151 and 153 are like the baffles 121, 123 (FIG. 14) but infused at a right angle.

Figure 19:
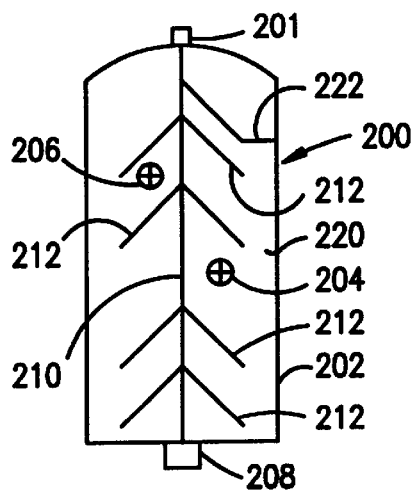
FIG. 19 is a side view in cross-section of a fuel purifier system according to the present invention.
Figure 21:
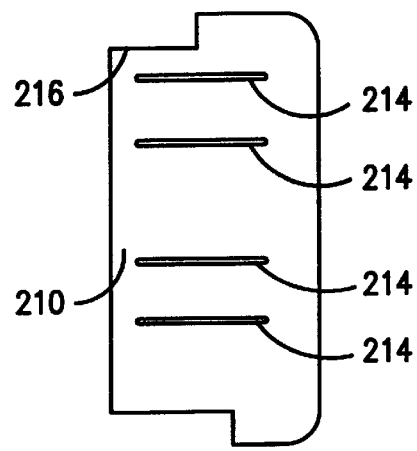
FIG. 21 is a front view of a plate of the apparatus of FIG. 19.
Figure 22:
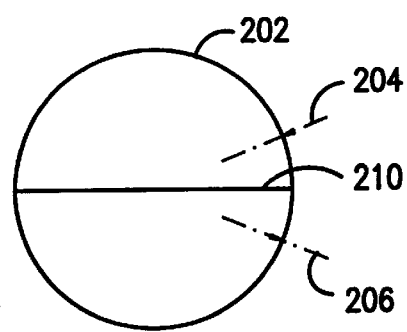
FIG. 22 is a top view of the plate of FIG. 21.
Figure 23:
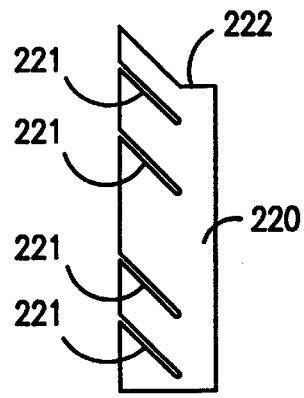
FIG. 23 is a side view of a quarter-plate baffle of the apparatus of FIG. 19.

FIG. 19 shows a part of a system 200 similar to systems described previously herein with a vessel 202 having an inlet 204, a gas purge device 201, an outlet 206, and a drain 208. A vertical baffle plate 210 within the vessel 202 has a plurality of downwardly projecting plates 212 which each has an end that is inserted into and, in one aspect, secured within a slot 214 in the plate 210. Fuel may flow up over a top edge 216 of the plate 210. FIG. 23 shows a side view of a quarter baffle plate 220 of the system 200. The plates 212 of the vertical baffle plate 210 are received in recesses 221 in the quarter baffle plate 220. Fuel may flow up over a top edge 222 of the quarter baffle plate 220.

In another embodiment of a system according to the present invention, the system has three hollow intercommunicating spheres stacked vertically in connection with each other. Fuel to be treated/purified enters the center of a middle sphere and is diverted in one direction, either right or left, into that sphere. The majority of the contaminants separated in this center sphere drop out of the center sphere into a bottom sphere. Clean fuel from the center sphere enters an upper or top sphere. Both the top and bottom spheres act as quiescent zones, allowing for the fall out of contaminants in the top sphere and the rising of clean fuel in the bottom sphere. Very few contaminants enter the top sphere. Cleaned fuel flows out from an outlet in the top sphere. In one aspect any of the dividers or baffles described herein may be used in any or all of the spheres. In another embodiment, like that of FIG. 1, a system according to this invention, e.g. but not limited to one like the system 10, is used between the tank T and the engine E—either in place of or in addition to the system shown in FIG. 1 below the tank T.

FIGS. 24a–24e illustrate a fuel purifier system 300 according to the present invention which has a hollow vessel 312 with an interior space 311, a fuel inlet 313, a fuel outlet 314, a drain 315, an inlet fuel flow diverter 317, an inner tube 340, top divider apparatus 320 which includes upright baffles 321 and 323 which intersect at their mid portions at substantially a right angle forming a four-bladed or four-membered device with the blades at right angles to each other, forming a cross as viewed from above or below. It is within the scope of this invention for the blades to be at any desired angle to each other. A bottom divider 330 similarly has baffles 331 and 333. It is within the scope of this invention to use more than two such baffles (in any embodiment disclosed herein) e.g. three at 60 degree angles to each other, four at 45 degree angles to each other, etc.; or baffles at different angles to each other. It is also within the scope of this invention to use two, three or more flow diverters each for inputting fluid to the hollow vessel 312, in one aspect equally spaced apart around the vessel, and at the same or different levels.

Figure 24A:
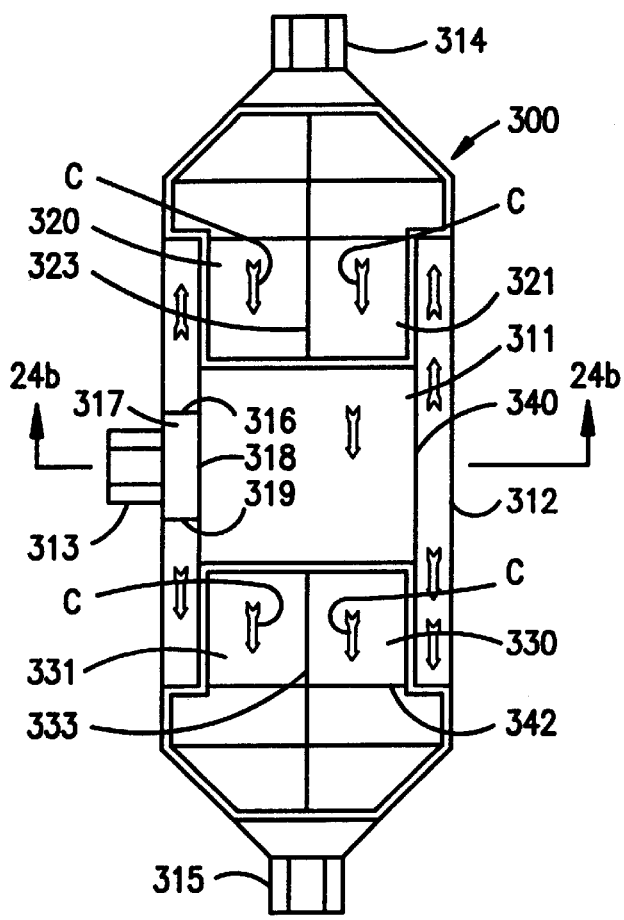
FIG. 24a is a side cross-section view of a system according to the present invention.

Arrows in FIG. 24a show schematically the general direction of fluid flow from the inlet 313 to the outlet 314 and to the drain 315. Contaminated material, particularly material moving down in the inner tube 340, settles out toward the bottom of the vessel 312. Downwardly pointing arrows indicate the general direction of flow of contaminated material that is settling out from the fuel (e.g. water, bacteria, algae, and/or suspended particulate solids in a fuel such as diesel fuel) primarily in the quiescent area in the inner tube 340. The divider apparatus as in certain embodiments are secured in any suitable manner (not shown) to the vessel 312 (e.g. by welding, adhesives, or fasteners such as nuts and bolts). In other embodiments the divider apparatuses are sized and configured to sit within the vessel without additional securement. Appropriate known selective closure devices (e.g. manual and/or automatic) are used for the inlet, outlet, drain and an optional gas purge (not shown). Also, as desired a pump or pumps may be used at any of these openings or in conduits connected with them to facilitate fluid flow.

Figure 24C:
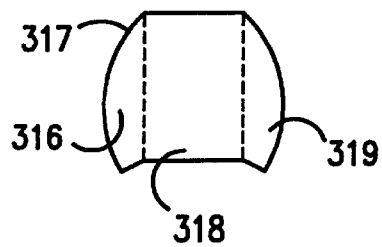
Figure 24D:
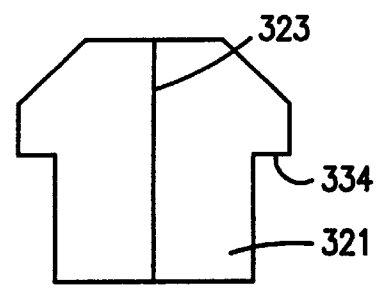
Figure 24B:
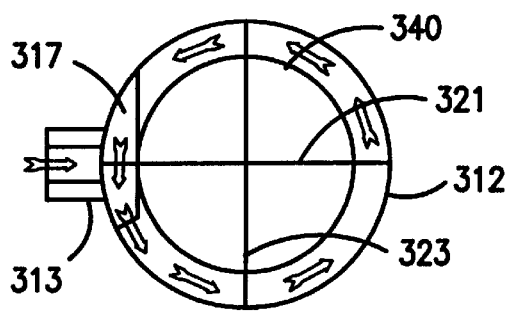

Arrows in FIG. 24b show that the flow diverter 317 changes the direction of inlet fuel flow from a first direction, as shown in FIG. 24a, to a second direction or directions other than the first direction (shown in FIG. 24b). The flow diverter also reduces the velocity of the inlet fuel.

A tube 340 with a substantially vertical side wall rests on the bottom divider 330 in the vessel 312. An unobstructed quiescent flow zone in this tube has arrows labelled "C" that indicate contaminant material (e.g., particles, liquid droplets) flowing down within the tube 340, between blades of the dividers, and to the drain 315. The blades serve to further nullify the effects of lateral fluid movement in the quiescent zone.

As shown in FIG. 24c the manifold 317 has a top 316, a side wall 318, and a bottom 319.

Figure 24E:
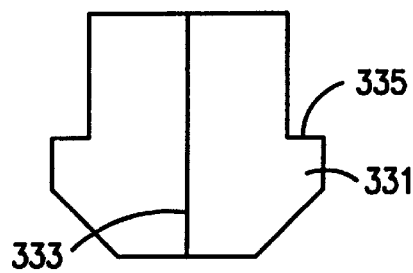

FIG. 24d shows the four-bladed or four-membered upright baffle 321. FIG. 24e shows the lower baffle 331.

In the system 300, the upper baffles have a shoulder 334 and the lower baffles have a shoulder 335. These shoulders abut ends of the tube 340 and the dividers facilitate correct positioning of the tube 340 in the vessel 312 and the tube helps position the dividers. The system 300 as shown may be used upright as shown or inverted. In one aspect the inlet fluid velocity for the system 300 is about 7 feet/second and this velocity is reduced in the area between the inner wall and the outer wall of the inner tube 340 to about 3.25 feet/second. In certain aspects the fluid makes about one revolution per second around this area.

Figure 25:
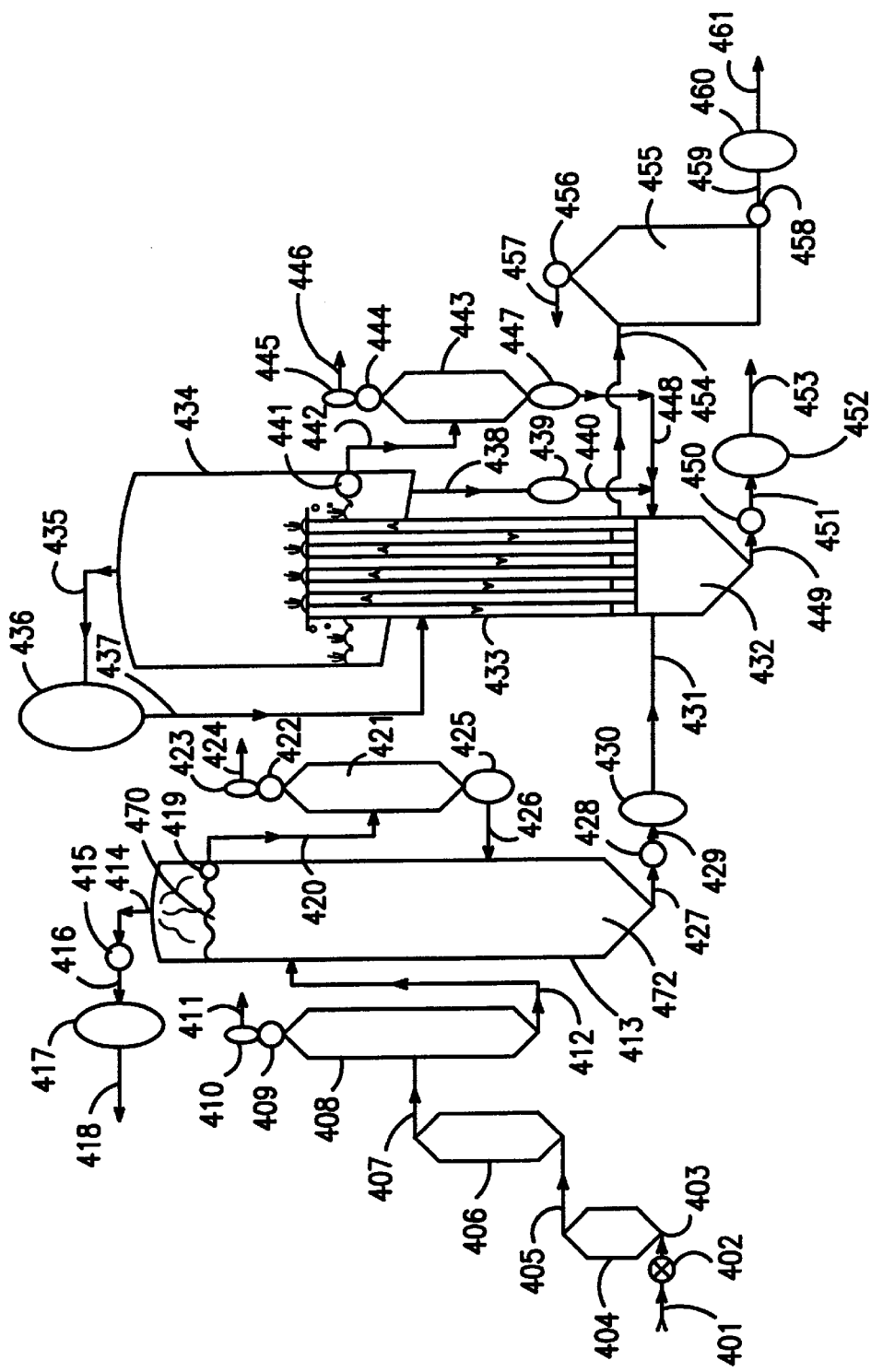
FIG. 25 is a schematic view of a system according to the present invention.

FIG. 25 is a schematic view of a system 400 for purifying contaminated liquid according to the present invention and, in one aspect, for separating a denser liquid from a less dense liquid. Such liquids include, but are not limited to, water with waste material in it such as hydrocarbons, fine wood pulp, oil, animal fat, liquid food waste (e.g. as from a rice mill, corn mill or other grain mill), chemical substances lighter than water, chemical substances lighter than water with a boiling point higher than water, and/or suspended solids.

As shown in FIG. 25, inlet liquid with contaminates enters in a line 401 into a heat exchanger 404. A vacuum valve 402 controls flow in the lines 401 and 403. The heat exchanger 404 is optional and is used to heat (or cool) the incoming liquid, e.g. water with undissolved animal fat which, when sufficiently raised above ambient temperature by the heat exchanger, will dissolve in the water. The heat exchanger may use heat generated elsewhere in the system 400, e.g. from steam from a fresh water tank or steam from a degasser.

Liquid then flows in a line 405 to a separation enhancer 406 which is any commercially available liquid/solid separation enhancer such as, but not limited to, an electro-flocculation device or "shocker."

In a line 407 the liquid then flows to a purifier 408 which is like any fuel or liquid purifier previously described herein or claimed herein or in the parent application. Undesirable lighter-than-water contaminates are pumped from the purifier 408 by a pump 410 to a line 411 which is, in one aspect, connected to a recovery/storage tank (not shown). A valve 409 (e.g. a check valve) prevents air from flowing into the vacuum system. Somewhat purified liquid exits the bottom of the purifier 408 in a line 412 and flows to a degasser 413

(e.g. any suitable commercially available degasser apparatus). In one aspect vacuum level in the degasser is between about 27 to about 29 inches of Hg.

One suitable degasser employs a relatively high vacuum to release "light ends" such as BTEX, which have a boiling point less than about one hundred ninety six degrees Fahrenheit. Particulates that are heavier-than-water fall out and down in the degasser and the light ends vaporize. Substances which are lighter than water with a boiling point higher than that of water, e.g. free oil, hydrocarbons, fats, and particulates lighter than water, rise to the top of the degasser. The vacuum may also facilitate the breaking of some emulsions.

A vacuum pump 417 provides the vacuum for the degasser 413 in the lines 414 and 416. A check valve 415 prevents air from entering these lines. Light ends may be vented in a line 418 or they can be transmitted to the heat exchanger 404 or to an additional heat exchanger for heat recovery therefrom.

Material floating on a top surface 470 of liquid 472 in the degasser 413, e.g. oils, hydrocarbons, animal fats, particulates, or other substances, is removed by known oil removal systems or devices, or is skimmed off by a weir or skimmer 419, shown within the degasser 413 but which, optionally, may be disposed outside the degasser. Material is pumped by a circulation pump from the skimmer 419 in a line 420 to an oil/water/particulates separator 421 (which may be any fuel or liquid purifier previously disclosed or claimed herein or in the parent application). A pump 423 pumps material from the top of the separator 421 in a line 424 to a tank (not shown). A check valve 422 prevents air from getting into the vacuum system. A circulation pump 425 pumps liquid (water) back to the degasser 413 in a line 426.

A pump 430 pumps liquid from the degasser 413 to a distillation unit 432 through lines 427, 429, and 431. A check valve 428 prevents air from getting into the vacuum system. Liquid from the degasser may contain water, heavy particulates, starches, sand, wood pulp, etc. "Heavies" collect in the bottom conical section of the distillation unit; "heavies" may include food processing waste, non-dischargable waste, re-useable chemicals, minimized waste, or recoverable by-products.

Typically cooler liquid from the degasser is drawn up into a heat exchanger 433 by a vacuum pump 436. This liquid is heated by steam and water flowing down from an expansion chamber 434. In one aspect the vacuum level in the chamber 434 is about 14 inches Hg. The vacuum pump 436 is between lines 435 and 437. Water flashes to steam in the expansion chamber 434, heavy particulates fall, steam flows up, and light non-vaporized substances (e.g. oil, animal fat, wood fiber) float on top of the remaining water. Preferably the bottom of the expansion chamber 434 is slightly inclined to vacilitate movement of and pumping out of solids. Steam is removed through the line 435. Pressure in the line 437 is preferably at or near atmospheric pressure.

A circulation pump 439 pumps heavies from the bottom of the expansion chamber 434 in a line 438 to a line 440 and back into the lower part of the unit 432.

A weir or skimmer 441 within the unit 432 skims off material floating on the water in the unit 432. Any known material removal system or device may be used. Opitionally the skimmer 441 is placed outside the unit 432. This material flows in a line 442 to an oil/water/particulates separator 443 (e.g. like any fuel or liquid purifier previously disclosed herein or claimed herein or in the parent application). A pump 445 pumps light ends to a line 446 for transmission to a recovery/storage tank (not shown) and a check valve 444 prevents air from entering the vacuum system. A circulation pump 447 pumps water in a line 448 back to the unit 432. A pump 452 removes heavies in lines 449, 451 and 453 from the unit 432 and transmits them to a storage tank (not shown). A check valve 450 prevents air from entering the vacuum system.

Distilled water flows in a line 454 to a tank 455 (which may be under vacuum or at atmospheric pressure). A check valve 456 on top of the tank 455 prohibits the entry of air into the tank 455 when the tank 455 is under vacuum. When the tank 455 is at atmospheric pressure, the check valve emits excess steam from the tank in a line 457. A pump 460 pumps water from the tank 455 in lines 459 and 461. A check valve 458 prevents air from entering the vacuum system.

It is within the scope of this invention to delete any two of the separators 408, 421, and 443 or to use any one or two of them.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A fuel purifier comprising a hollow housing with an interior space defined by an interior wall, an inlet port for liquid fuel contaminated with contaminating material denser than the liquid fuel, the liquid fuel entering the inlet port into the interior space in a first direction, a first outlet port from which purified liquid fuel flows out from the hollow housing, and a second outlet port from which contaminant material drains from the hollow housing, an imperforate inner tube within the hollow housing and spaced apart from the interior wall of the hollow vessel, the inner tube providing in an interior space thereof an unobstructed quiescent zone for settling out of material, the imperforate inner tube having open upper and lower ends, the upper end positioned adjacent the first outlet port and the lower end positioned adjacent the second outlet port, a flow diverter adjacent the inlet port within the interior space for receiving the liquid fuel from the inlet port and for diverting the liquid fuel in a second direction other than the first direction, a first baffle having a portion disposed within the upper end of the imperforate tube and a plurality of upwardly projecting spaced-apart baffle blades extending above the upper end of the imperforate tube, the first baffle's blades each having a top beneath and spaced-apart from the first outlet port, and, a second baffle having a portion disposed within the lower end of the imperforate tube and a plurality of downwardly projecting spaced-apart baffle blades extending below the lower end of the imperforate tube, the second baffle's blades each having a bottom above and spaced-apart from the second outlet port.

2. The fuel purifier of claim 1 further comprising
the flow diverter comprising
a side wall,
a top wall secured to a top of the side wall, and
a bottom wall secured to a bottom of the side wall.

3. The fuel purifier of claim 1 further comprising
said side wall closing off a first end of the flow diverter so that fluid flows from the flow diverter only out of an opening at a second open end of the flow diverter.

4. The fuel purifier of claim 3 further comprising
the second open end of the flow diverter having a generally rectangular shape when viewed from the second open end.

5. The fuel purifier of claim 4 wherein the inlet is a generally cylindrical pipe with an inner diameter through which liquid fuel flows into the flow diverter and the rectangular shape of the second open end has a width that is between about 30% to about 60% of the inner diameter of the cylindrical pipe.

6. The fuel purifier of claim 5 wherein the width is about 50% of the inner diameter of the inlet pipe.

7. The fuel purifier of claim 5 wherein a length of the second open end is about 40% to about 60% of the inner diameter of the cylindrical pipe.

8. The fuel purifier of claim 7 wherein a length of the second open end is about 50% of the inner diameter of the cylindrical pipe.

9. A method for purifying liquid fuel in a tank contaminated with contaminating material, the method comprising
flowing the liquid fuel with contaminating material from the tank to a fuel purifier for purification therein, the fuel purifier comprising a hollow housing with an interior space defined by an interior wall, an inlet port for liquid fuel contaminated with contaminating material denser than the liquid fuel, the liquid fuel entering the inlet port into the interior space in a first direction, a first outlet port from which purified liquid fuel flows out from the hollow housing, and a second outlet port from which contaminant material drains from the hollow housing, an imperforate inner tube within the hollow housing and spaced apart from the interior wall of the hollow vessel, the inner tube providing in an interior space thereof an unobstructed quiescent zone for settling out of material, the imperforate inner tube having open upper and lower ends, the upper end positioned adjacent the first outlet port and the lower end positioned adjacent the second outlet port, a flow diverter adjacent the inlet port within the interior space for receiving the liquid fuel from the inlet port and for diverting the liquid fuel in a second direction other than the first direction, a first baffle having a portion disposed within the upper end of the imperforate tube and a plurality of upwardly projecting spaced-apart baffle blades extending above the upper end of the imperforate tube, the first baffle's blades each having a top beneath and spaced-apart from the first outlet port, and, a second baffle having a portion disposed within the lower end of the imperforate tube and a plurality of downwardly projecting spaced-apart baffle blades extending below the lower end of the imperforate tube, the second baffle's blades each having a bottom above and spaced-apart from the second outlet port, flowing the liquid fuel with contaminating material into and through the inlet in the first direction, flowing the liquid fuel into and through the flow diverter, the liquid fuel exiting the flow diverter in the second direction, flowing the liquid fuel into the unobstructed quiescent zone in which contaminants settle out from the liquid fuel, and flowing purified fuel out from the first outlet port of the fuel purifier.

10. The method of claim 9 wherein the flow diverter has a side wall, a top wall secured to a top of the side wall, and a bottom wall secured to a bottom of the side wall, a side wall closing off a first end of the flow diverter so that fluid flows from the flow diverter only out of a second open end of the flow diverter, the second open end of the flow diverter having a generally rectangular shape when viewed from the end, and wherein the inlet is a generally cylindrical pipe with an inner diameter through which liquid fuel flows into the flow diverter and the rectangular shape of the second open end has a width that is between about 30% to about 60% of the inner diameter of the cylindrical pipe, and the method further comprising
flowing the liquid fuel out from the second open end of the flow diverter in a sheet stream along the interior surface of the side wall of the vessel.

* * * * *